United States Patent [19]

Oros et al.

[11] Patent Number: 4,912,299
[45] Date of Patent: Mar. 27, 1990

[54] GAS METAL ARC WELDING OF ALUMINUM-BASED WORKPIECES

[75] Inventors: Alvin K. Oros, Farmington Hills; Paul D. DeJager, Rochester Hills, both of Mich.

[73] Assignee: Ford Motor Company, Dearborn, Mich.

[21] Appl. No.: 405,252

[22] Filed: Sep. 11, 1989

[51] Int. Cl.$^4$ .............................................. B23K 9/225
[52] U.S. Cl. ................................ 219/137 PS; 219/74; 219/137 WM
[58] Field of Search ................. 219/137 PS, 137 WM, 219/137 R, 74

[56]  References Cited

U.S. PATENT DOCUMENTS

| | | |
|---|---|---|
| 2,892,072 | 6/1959 | Miller .............................. 219/137 R |
| 4,273,988 | 6/1981 | Iceland et al. . |
| 4,507,543 | 3/1985 | Ukai et al. . |
| 4,542,280 | 9/1985 | Simons . |
| 4,628,181 | 12/1986 | Pan et al. . |
| 4,749,841 | 6/1988 | Galantino et al. . |

OTHER PUBLICATIONS

Welding Journal, American Welding Society, pp. 21–27, "GMA Welding of Aluminum with Argon/Freon Shielding Gas Mixtures."
Handbook published by Kaiser Aluminum Co., 1967, pp. 7-9 through 7-11, excerpts.
Welding Handbook of American Welding Society, vol. 4, 7th Ed. 1978, chap. 8, "Aluminum Alloys", pp. 347–348.
Technical Paper Presented at Aluminum Asso. Meeting, Mar. 1983, "MIG Welding of Aluminum", pp. 6.15 and 6.28.

Primary Examiner—Clifford C. Shaw
Attorney, Agent, or Firm—Joseph W. Malleck; Roger L. May

[57] ABSTRACT

Method of welding aligned aluminum torque tube components, comprising (i) defining a stepped square-butt joint to be welded by preforming the ends of said torque tubes and assembling such ends together in the nested condition; (ii) establishing an electrical direct current arc between a positive consumable aluminum-based electrode and said joint as cathode, the arc being shrouded in a shielding gas consisting, by volume, of 2–5% oxygen and the remainder inert gas, the current to the arc being pulsed at a frequency of 40–60 cycles per second while maintaining an average current of at least 200 amps; and (iii) while holding the pulsed arc in a predetermined orientation (i.e., position angle 45°–60°, lead angle 5°–15°, transverse angle 12°) to the joint, moving the arc along the joint in a single pass at a relative speed of at least 60 inches per minute.

14 Claims, 7 Drawing Sheets

Define stepped square-butt joint to be welded by preforming ends of torque tubes and assembling with interference fit.

↓

Establish electrical D.C. arc between positive consumable aluminum-based electrode and joint as cathode. The arc being shrouded in a shielding gas consisting, by volume, of 2–5% $O_2$ and the remainder inert gas. The current to the arc being pulsed at a frequency of 40–60 cycles/second while maintaining an average current of at least 200 amps.

↓

While holding the pulsed arc in an out-of-position orientation to the joint, moving the arc along the joint in a single pass at a relative speed of at least 60 inches per minute.

Weld Metal Transfer And Weld Profile

Low Current

Argon Shield

Prior Art

Medium Current

Argon Shield

Prior Art

Hi Current

Argon Shield

Prior Art

Pulsed Hi Current

Argon-$O_2$ Shield

Invention

GAS METAL ARC WELDING OF ALUMINUM-BASED WORKPIECES

BACKGROUND OF THE INVENTION

1. Technical Field

The invention relates to the art of gas metal arc welding and particularly to the welding of aluminum-based torque tubes used for automotive drivelines.

2. Discussion of the Prior Art

In consumable electrode arc welding processes, an electrode of indefinite length is continuously fed to a welding arc, established between the electrode and a workpiece, where it is melted by the intense heat of the arc and fuses with the workpiece. Generally, the metal deposited from the consumable electrode is shielded with an inert shielding gas, and thus the reference to the process as gas metal arc welding. Consumable electrode welding is not only substantially faster than nonconsumable electrode welding but is particularly adapted to the automatic welding of carbon and stainless steel where it has been predominantly used. The shielding gas provides a more easily ionized path than obtained in air, aiding smooth transfer of current and functioning to surround the arc and weld pool with an atmosphere that is nonreactive with the molten metal. For reasons of economy, argon and helium are the only gases in general use when welding aluminum. Of these two gases, argon is the most commonly used and promotes greater arc stability than helium.

A high current density is often employed to break up the molten metal of the electrode into very fine droplets by an increase in its vapor pressure, resulting in deeper weld penetration at a rate of about 200 drops per second. However, potential damage to some thin or nonferrous workpieces may result from use of such high currents.

Pulsing of the current supply to the arc has been developed along with improved shielding gases to lower the average current density to promote the welding of ferrous-based articles (see U.S. Pat. Nos. 4,273,988; 4,507,543; 4,628,181; and 4,749,841). The arc current is cyclically pulsed between a minimal value needed to maintain the arc and a maximum value which may be several hundred percent larger. The pulse frequency may range from several cycles per second up to several hundred cycles depending on conditions at the particular welding operation. Such welding is conducted by using a current having a waveform determined by four factors: a pulse current $I_p$, a base current $I_B$, a pulse duration $T_p$, and a base duration $T_B$. A high current will flow for a short time between the electrode and the workpiece to be welded while the average current $I_M$ is maintained at a low value. By flowing at high current for a short time, the arc is more stable and highly concentrated, and penetration is considerably deeper and the bead is relatively wider.

In the above patent disclosures, the shielding gases have included minor proportions of an oxidizing gas constituent ($O_2$ or $CO_2$) to improve gas ionization and thereby facilitate all-position welding of ferrous workpieces. When gas metal arc welding is used for aluminum workpieces, the prior art is pointedly assertive that oxidizing gases must be avoided due to the interference of oxides formed with the aluminum. It has been stated frequently in the literature: "such oxygen-bearing shielding gases cannot be used when welding aluminum, as the production of refractory oxides inhibits proper metal transfer and deposition", taken from an article published in *The Welding Journal*, American Welding Society, pages 21-27, 1985, entitled "GMA Welding of Aluminum With Argon/Freon Shielding Gas Mixtures". Further documents setting forth this state of art include: (a) excerpts from handbook published by Kaiser Aluminum Company, 1967, pages 7-9 through 7-11; (b) welding handbook of American Welding Society, Volume 4, 7th Edition, 1978, Chapter 8, entitled "Aluminum Alloys", pages 347-348; (c) technical paper presented at Aluminum Association Meeting, dated March, 1988, entitled "MIG Welding of Aluminum", pages 6.15 and 6.28.

The use of aluminum and aluminum alloys in automobiles is becoming increasingly popular. Such popularity is mainly due to the fact that aluminum components can be manufactured much lighter in weight than comparable steel components which they replace without sacrificing strength or durability. However, it is most difficult to securely join such aluminum driveshaft components using existing aluminum welding knowledge to achieve the kind of quality and productivity speeds achieved with welding of steel. The prior art has resorted to multiple pass welding at low current levels with extraordinarily large welding deposits to achieve welds on aluminum driveshafts (see U.S. Pat. No. 4,542,280). The disadvantage of such technique is that weld speeds obtainable are not compatible with the high volume requirements of automotive welding. These low current levels increase process variance by the cumulative effect of adding joint gap variations to other process variations and dictate the use of small diameter wires and their inherent feeding problems. The elimination of joint gap requirements is extremely important in high volume welding situations.

Therefore, it is an object of this invention to provide a method of welding aluminum torque tubes at speeds twice the level of that capable by the existing prior art for aluminum MIG welding and with a weld quality significantly improved with respect to fusion penetration, fusion width, and lack of porosity.

SUMMARY OF THE INVENTION

The invention meets the above object by essentially a three-step process, comprising: (a) preparing a stepped square-butt joint to be welded by preforming ends of aluminum-based torque tubes and assembling such tubes with an interference fit; (b) establishing an electrical direct current arc between a positive consumable aluminum-based electrode and the joint as cathode, the arc being shrouded in a shielding gas consisting by volume of 2-5% $O_2$ and the remainder inert gas, the current to the arc being pulsed at a frequency of 40-60 cycles per second while maintaining an average current of at least 180 amps; and (c) while holding the pulsed arc in a predetermined orientation to the joint, moving the arc along the joint in a single pass at a relative speed of at least 60 inches per minute.

It has been discovered that a small constituent of oxygen can be deployed in the shielding gas without degrading the joint if the joint is redesigned to consist of a stepped square-butt configuration and if the arc is restricted to a single pass along the joint at speeds in excess of 60 inches per minute. Any oxides resulting due to the oxygen constituent will not create porosity or poor weld fusion because welding is limited to a single pass.

It is preferred that the arc be stabilized with certain preferred parameters, comprising: a current having a square waveform, a base or threshold voltage of about 14–18 volts, a peak pulse current Ip of about 280–310 amps, a peak pulse duration Tp of about 1.4 milliseconds, and a base current duration $T_B$ of about 2.8 seconds. This will result in a base or threshold current $I_B$ that responds to the needs of machine and may be about 90–120 amps; the average current $I_m$ may be about 180–250 amps.

The shielding gas is preferably comprised of, by volume, 98% welding grade argon and 2% welding grade oxygen. Welding grade means moisture has been removed providing a −40° F. dew point at a purity of 799%.

The consumable electrode is preferably configured to have a diameter of about 0.045–0.065 inches and may be comprised of 4043 aluminum alloy. The aluminum torque tubes or workpieces are preferably comprised of 6062 aluminum alloy and may have a tube component thickness of about 0.086 inches, a yoke neck wall thickness of about 0.12 inches, and a yoke recess thickness of about 0.086 inches.

The arc is positioned relative to the joint preferably with a lead angle of about 5°–12°, a positioning angle of about 45°–50°, and a transverse angle (taken relative to a plane perpendicular to a tangent through the weld joint) of about 10°–14°.

SUMMARY OF THE INVENTION

FIG. 8 is an elevational view of automotive driveline components to be welded, illustrating the torch at a transverse angle to the plane of rotation of the workpieces;

DETAILED DESCRIPTION AND BEST MODE

The process of this invention utilizes gas metal arc welding in which an electrical arc is established between a consumable metal electrode and metal workpieces to be joined. To improve the quality and speed at which such welding process can take place with aluminum workpieces, it has been found that the joint design, presence of a controlled amount of oxygen in the shielding gas, speed of movement of the arc relative to the joint, and the absence of repeated cyclic weld heating of the joint, all play important roles in achieving the benefits of this invention.

Figure 1:
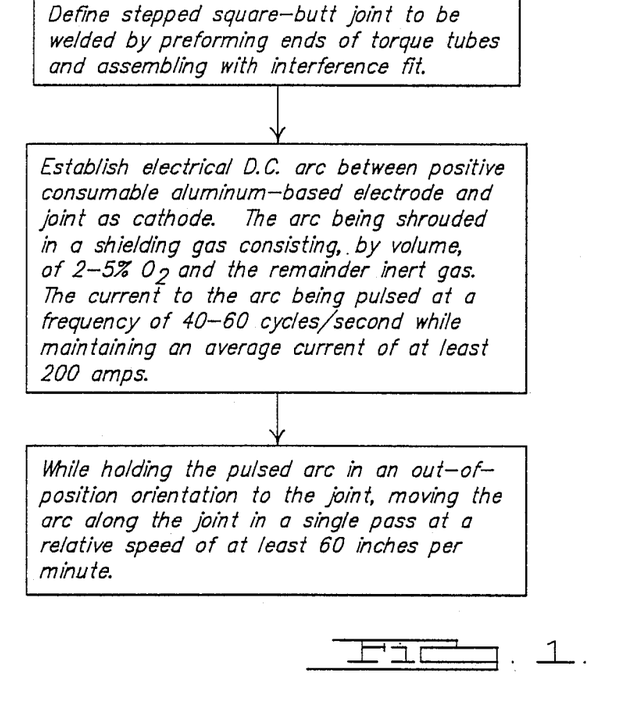
FIG. 1 is a schematic flow diagram of the process steps of this invention.

As shown in FIG. 1, the essential steps of the process herein comprise: (a) defining a stepped square-butt joint to be welded by preforming the ends of aluminum-based torque tubes and assembling such tubes with an interference fit; (b) establishing an electrical direct current arc between a positive consumable aluminum-based electrode and the joint as cathode, the arc being shrouded in a shielding gas consisting by volume of 2–5% oxygen and the remainder an inert gas, the current to the arc being pulsed at a frequency of 40–60 cycles per second while maintaining an average current of at least 180 amps; and (c) while holding the pulsed arc in an out-of-position orientation to the joint, moving the arc along the joint in a single pass at a relative speed of at least 60 inches per minute.

JOINT DEFINITION

Figure 2:
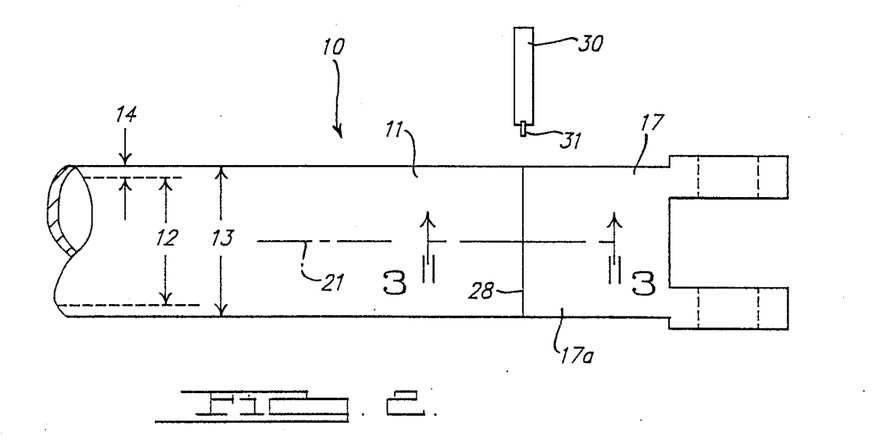
FIG. 2 is a general elevational view of the workpieces to be welded with the welding torch in position.

As shown in FIG. 2, two workpieces 11 and 17 are brought together along their axes to form an assembly 10 to be welded along a joint line. A welding gun or torch 30 is brought into proximity with the joined portions of the two workpieces and secured by a weld bead thereat.

Figure 3:
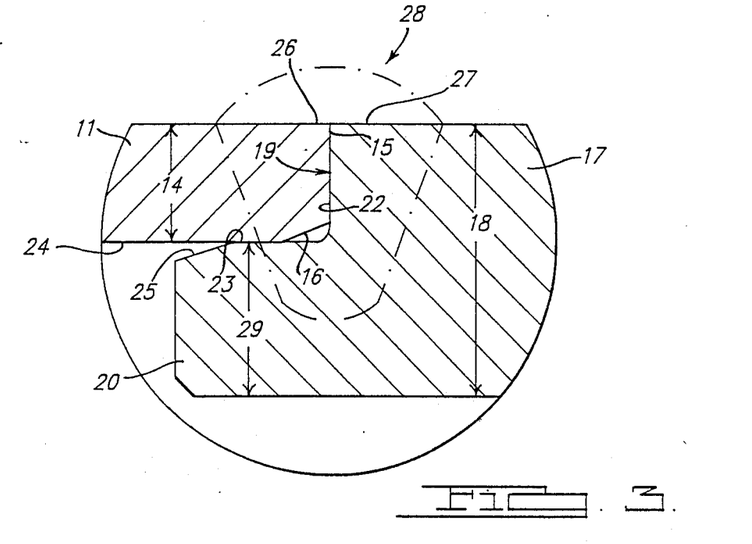
FIG. 3 is an enlarged sectional view of a portion of the joint to be welded, showing the joint configuration required and the weld filler profile.

The joint must be of special configuration. One component or workpiece 11 is an aluminum torque tube having a hollow interior, cylindrical in shape, and has a wall thickness 14 defined by an internal diameter 12 and an external diameter 13. The cylindrical end portion of tube 11 is formed with a flat surface of face 15 extending in a radial direction with respect to the axis 21 of the tube. The internal annular edge of the face 15 is provided with a chamfer 16.

The other component is an aluminum-based yoke 17 having a cylindrical end portion 17a of a substantially greater thickness 18 than tube 11. Portion 17a has an annular recess 19 defining a neck 20 extending in an axial direction; the neck is provided with chamfers 25 at its radially inner and outer edges. Recess 19 defines a radially extending shoulder surface 22 to matingly receive the surface 15 of torque tube 11.

The cylindrical end portions of the tube 11 and yoke 17 are nested together in an axial direction with surface 23 of the neck 20 fitting within the interior surface 24 of torque tube 11; such fit is preferably an interference fit. With neck 20 nested within torque tube 11, the end face 15 of the tube 11 is brought into square-butting relationship with the shoulder surface 22 of the yoke portion and the exterior surfaces 26 and 27 are coterminus to provide a flush exterior. The resulting interference fit between the two workpieces provides what is here defined to be a stepped square-butt joint 28. It is stepped in the sense that recess 19 creates a step in the end portion 17a and it is a square butt in the sense that the surfaces 15 and 22 meet in flush surface-to-surface contact and are square (perpendicular to the axis of the torque tubes). In no event should there be any root gap between the surfaces 15 and 22 if the benefits of this invention are to be achieved.

For purposes of an example, thickness 13 is desirably about 0.086 inches, thickness 29 is about 0.12 inches, and thickness 18 is about 0.21 inches.

ESTABLISH ARC

Figure 4:
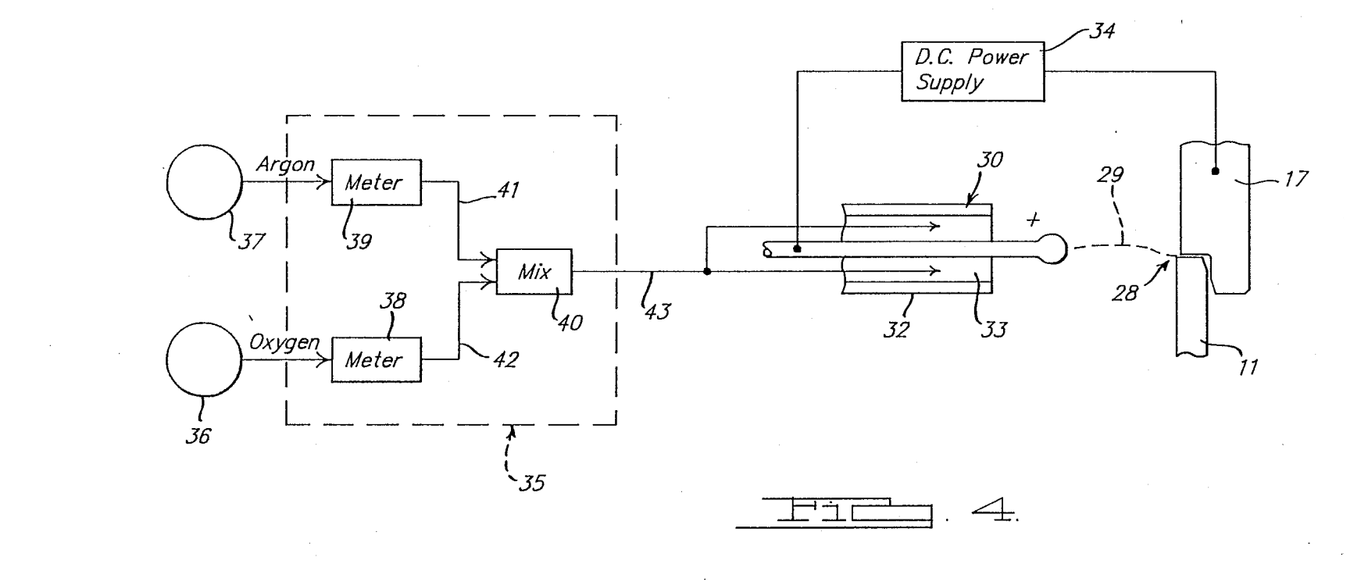
FIG. 4 is a layout of the torch system used to carry out the welding.
Figure 5:
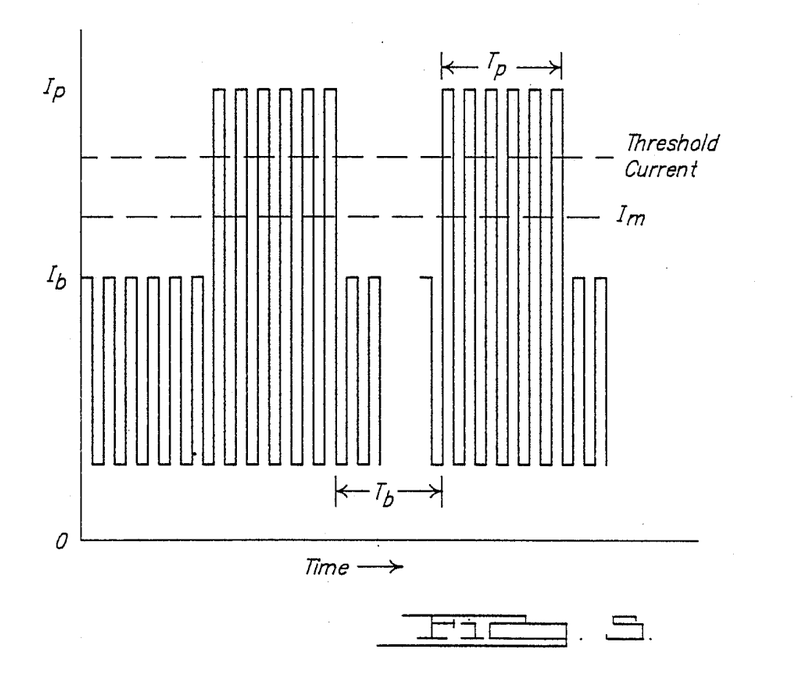
FIG. 5 is an illustration of the welding current waveform provided by the power source used to carry out the welding process herein.

As shown in FIG. 4, the process next requires the establishment of an arc 29 between a consumable metal electrode 31, held and advanced by a torch 30, and a joint or workpiece cathode 28. The direct current power supply system 34 has electrode 31 arranged as positive. The direct current supply is in the range of about 15 to 80 amps, with a frequency of about 5000–25,000 cycles per second.

Electrode 31 is preferably comprised of an aluminum-based wire composition alloy 4043 and the aluminum-based workpieces are preferably comprised of aluminum alloy 6062. These alloys were selected to match each other in preventing hot shortness cracking. Electrode 31 is fed along the axis of the welding torch 30 during the welding operation to maintain a desired spacing of the electrode tip from the weld profile as the tip is being consumed.

A shielding gas mixture is directed to the region of the weld. Inert gases which have been used heretofore for such purposes have been primarily commercially comprised either of argon or of helium without the presence of oxygen when welding aluminum. Argon is the most commonly used because of its availability. Helium has a low density requiring a greater volume to produce the necessary shielding. However, because of the higher ionization potential of helium, deeper weld penetration is possible than with argon but has somewhat greater arc instability.

It has been found that helium or argon, as the sole constituent for the shielding gas, is not sufficient. A small volume percent of oxygen must be present in order to achieve a high strength weld. The oxygen also stabilizes the arc by aiding the flow of electrons to reduce the work function and thus make the wall less subject to contamination. To this end, pressurized supplies of oxygen 36 and argon 37 are accurately metered, by meters 38 and 39 respectively, to a mixing valve 40 by way of flows 42 and 41. The mixed shielding gas is then transferred by way of a flow 43 along space 33 surrounding the electrode within the outer torch wall 32, to shroud and envelope not only the arc 29 but joint 28 undergoing welding.

When less than 2% oxygen is mixed with the argon gas, it has been found that the weld may be undesirably contaminated by dirt. When greater than about 5% oxygen is present, excessive oxides will be produced, affecting weld strength.

Welding is carried out at a relatively low average current output. When a transfer of metal is required, the power source pulses the current slightly above a spray transfer threshold level and large droplets of metal (slightly smaller than the diameter of the electrode) are forced to cross the arc. The frequency of the these pulses is balanced with the burn-off rate requirements of the wire to assure a steady stream of large droplets without explosive spray. Welding can be done at such relatively low current levels using a large diameter wire (0.045–0.065 inches) and spatter is virtually eliminated. It is desirable to use a constant voltage type power source system with variations in current to provide high energy outputs for optimum arc starting. The voltage can vary between 23–26 volts.

Only high purity, dry inert gas commercially referred to as "welding grade" should be used in this procedure. Impure or wet gas will degrade weld quality. Gas impurities break down to hydrogen and oxygen in the welding arc and react with the molten aluminum to form porosity and dross.

Figure 6:
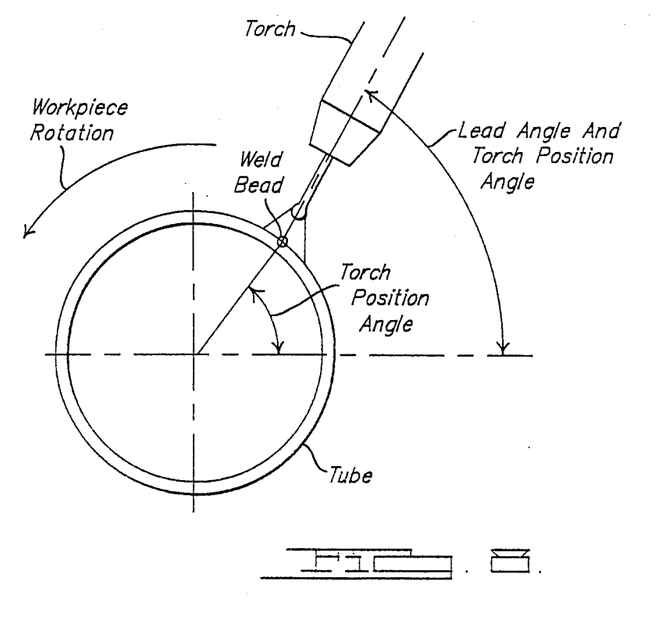
FIG. 6 illustrates weld penetration as a function of current for various torch positions.

As shown in FIG. 6, a current of a rectangular pulse waveform is used. The waveform of this pulse current is determined by four factors: a pulse current $I_p$, a base current $I_b$, a pulse duration $T_p$ (such as 1.4 milliseconds), and a base duration $T_b$ (such as 2.8 milliseconds). A high current may flow for a short time between the electrode and the workpiece to be welded while the average current $I_m$ is maintained at a low value (such as 200–245 amps). With direct current, electrode positive power, the filler metal will be transferred across the arc as a stream of fine superheated droplets (i.e., 100 drops per second) when the welding current is pulsed for periods below the spray level and alternative periods slightly above the spray level. These values will depend upon the electrode alloy, size, and feed rate. Metal transfer not only takes place during the periods of high welding current $I_p$, but is promoted or prepared during the intervening periods of low current $I_b$. This action reduces the overall heat input to the base metal for good control of the molten weld pool and the penetration. The lower heat input makes it easy to weld thin aluminum sections. Electrode composition must be monitored because low vapor pressure elements will increase risk of spatter. The vapor pressure of magnesium tends to cause disintegration of the droplets as they separate from the electrode tip; this produces small spatter balls that are often thrown clear of the arc and thus should be avoided.

Figure 7:
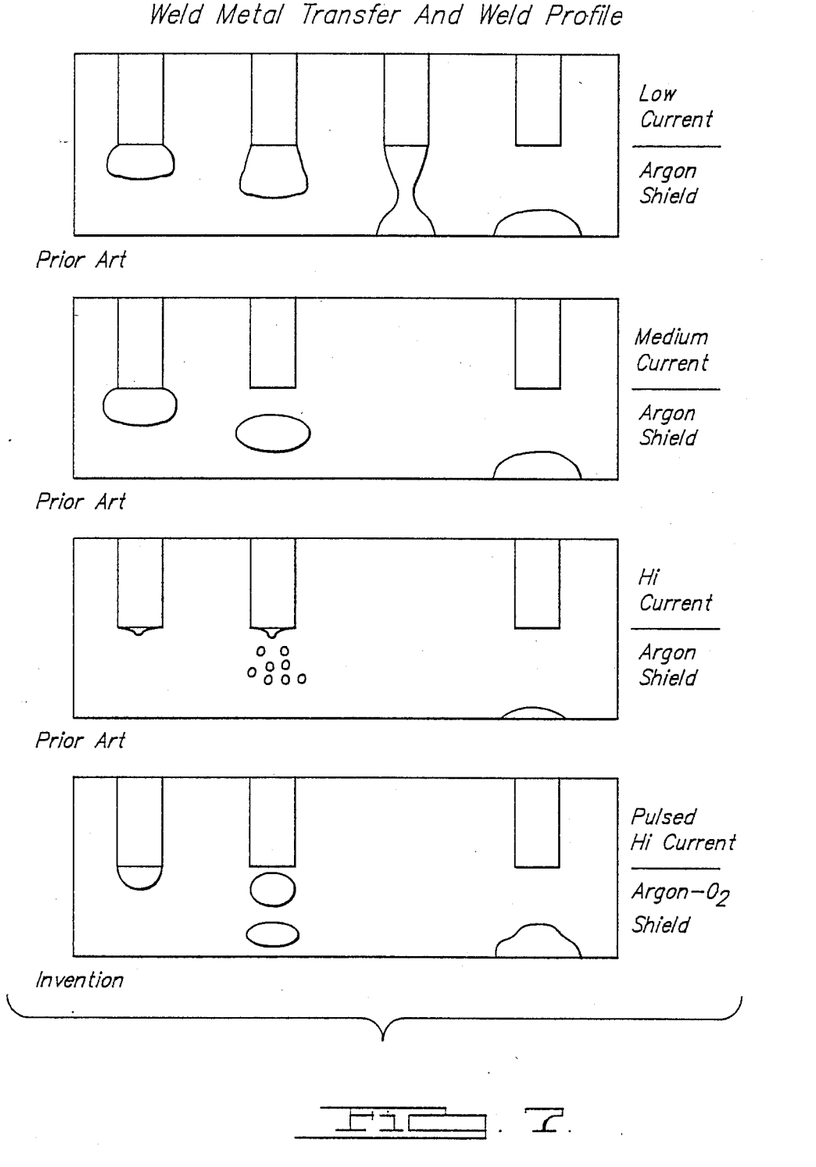
FIG. 7 is a composite view of different prior art weld transfer modes and weld profiles as compared to the transfer mode and weld profile of this invention.

The constant voltage, pulsed current avoids problem associated with the prior art (see FIG. 7). Depending upon the level of current used with the process, a problem of incomplete fusion can be encountered at lower current densities and argon shield. Transfer of molten electrode metal will be in the form of globules at such low current densities; the globules frequently are larger than the diameter of the electrode and transfer at very low rates, for example, at a rate of about five drops per second. This low current process is sometimes referred to as short circuit welding. At medium current densities, the globules also tend to form as much as twice the diameter of the electrode (5–10 drops per second) and eventually break loose and transfer to the workpiece. In either case, with low or medium current densities, the weld sometimes exhibits poor fusion. When the arc voltage is in the spray transfer range accompanied by constant high currents, transfer of the droplets (i.e., >720 drops per second) will be scattered and lacking in density. If the arc voltage is decreased significantly with adequately high current, shortcircuiting will occur. This type of transfer is not recommended for aluminum because of incomplete fusion.

In this invention, pulsed high current with an argon-$O_2$ shield provides a metal transfer by microglobules or droplets intermediate fine spray droplets and globules (i.e., 100 drops/second). A constant voltage power source is employed along with constant speed electrode drive. The welding background voltage is set allowing the welding background current $I_B$ to respond thereto. The arc base voltage is set to a value slightly below that for spray transfer, usually in the range of 14–18 volts. The electrode drive unit will adjust the feed rate to maintain the preset arc voltage. The voltage setting is critical with respect to good fusion with the groove faces. If the voltage is too high, lack of fusion may occur. If the voltage is too low, shortcircuiting will take place between the electrode and the weld pool. The $I_b$ current is pulsed to an $I_p$ current at 40–60 cycles per second. $I_m$ current will be about 230–250 amps and must be at least 200 amps.

As shown in FIG. 6, the relationship between welding current and penetration is plotted using the average penetration obtained when the welding current is set at its low and high levels. The illustration shows that the average welding current needed to remain within the minimum and maximum allowable penetration levels would be between 230-270 amperes. Note from the illustration that the penetration will vary with the torch position and shift the welding current plot.

RELATIVE ARC/JOINT MOVEMENT

Figure 9:
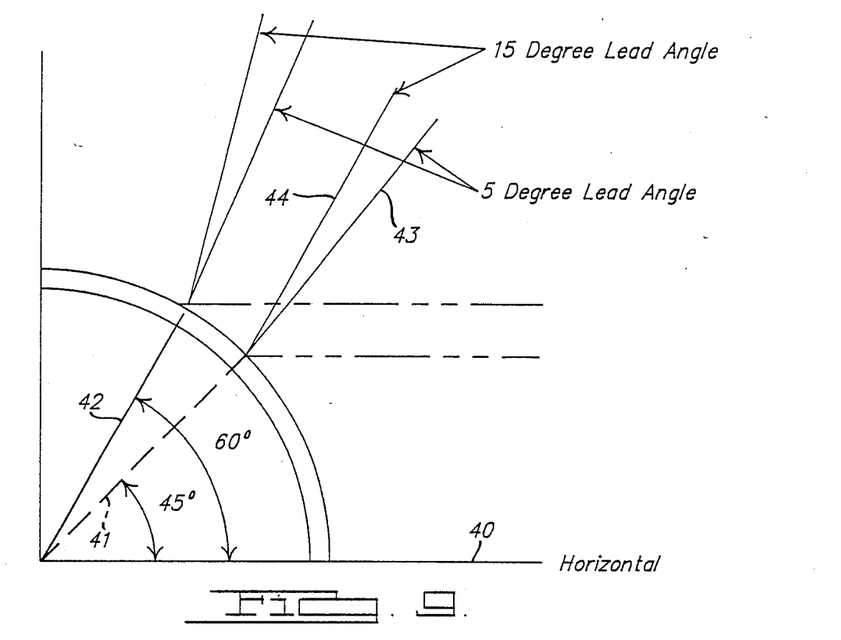
FIG. 9 is an enlarged sectional view taken along line 9—9 of FIG. 8.
Figure 10:
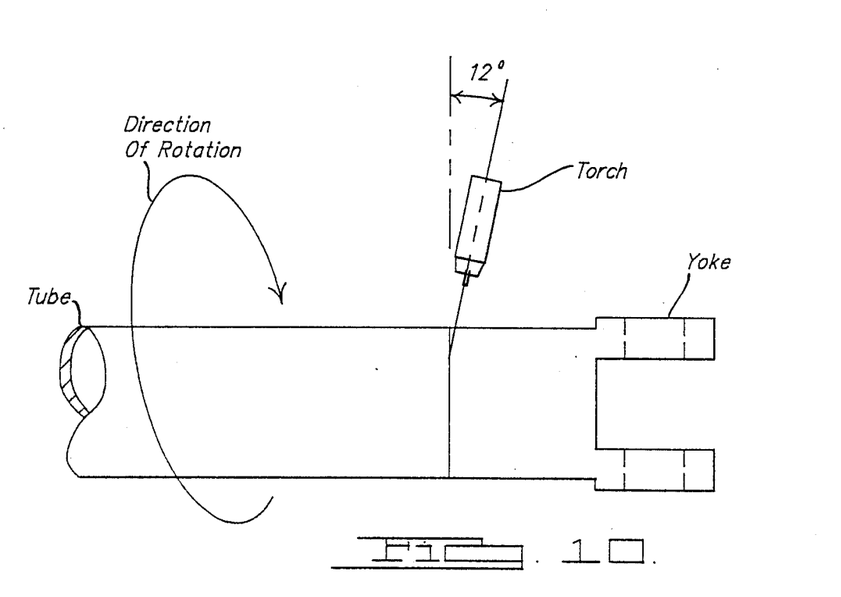
FIG. 10 is a schematic illustration of torch angles, lead and position, useful in carrying out the inventive process.

It is desirable to carry out welding with the torque tubes or driveshaft in the horizontal position. This gives added importance to the parameters of torch position and torch angle. Torch position, as shown in FIGS. 8 and 9, is the angle between the axis 41 or 42 of the torch electrode and a horizontal plane 40. The torch lead angle is the angle formed between an extension of line of axes 41 or 42 for the torch position angle passing through the weld bead and the new axis, 43 or 44, of the torch electrode aimed to pass through the weld bead also. The torch lead angle is important because it aids in controlling the formation and shape of the weld bead. The torch will be inclined from a perpendicular to a tangent at the point of welding. The torch will be inclined in the direction of rotation to provide a leading torch angle; that is, the arc is pointed in the direction of unwelded base metal as the weld progresses. As the torch position increases from vertical to horizontal, the effect of welding current on penetration decreases significantly. When the torch position is set at 60°, the maximum allowable penetration can no longer be achieved even at the highest current settings. On the illustration of FIG. 6, the projected torch position of 54° is the torch position where the current curve must closely simulate the average current/penetration relationship shown.

Optimization studies have shown that with a pulse type welding system, a 4043 electrode wire having a diameter of 0.0625 inches and utilizing a shielding gas of 98% argon and 2% oxygen with a flow rate of 30-40 cfh and a tip-to-work distance of ⅝-¾ inch, the average welding current can be deployed in the range of about 200 amperes with a base voltage of 16 volts, and the travel speed of the electrode relative to the weld joint can be in the range of 60-65 inches per minute. The effects of contamination and welds can be reduced if the torch has a transverse angle where the torch is inclined 12° to the longitudinal axis of the driveshaft and pointed toward the yoke.

Torch position and welding travel speed are important and influential factors in controlling penetration and fusion with (torch position having a slightly higher influence on penetration than travel speed). Increasing either of these factors tends to decrease penetration. The desirable torch lead angles for purposes of the best mode were determined to be about 10° for lead angle, 51° for position angle, and about 12° for transverse angle.

Figure 11:
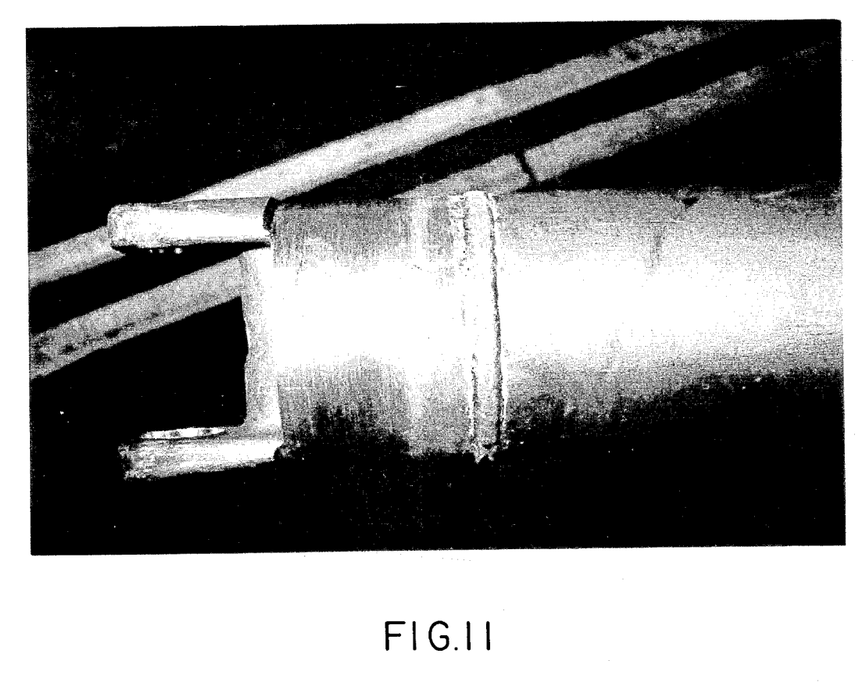
FIG. 11 is a photograph of a completed weld bead for the illustration of FIG. 1.

The torch speed relative to the workpiece is of critical significance to this invention. By using a single pass and a lineal torch speed of at least 60 inches per minute (often as high as 80 inches per minute), the quality of the weld can be improved in keeping with improvement in the productivity of the weld. The fastest weld speeds that have been used to date in the prior art for welding aluminum, regardless of thickness of the workpiece, has been a maximum of 30 inches per minute in production. As shown in FIG. 11, the weld profile of a completed driveshaft has a weld crown which is symmetrically curved and a wide fusion width measured at the base of the weld joint.

While particular embodiments of the invention have been illustrated and described, it will be noted that various changes and modifications may be made without departing from the invention, and it is intended to cover in the appended claims all such modifications and equivalents as fall within the true spirit and scope of the invention.

What is claimed:

1. A method of welding aligned aluminum torque tube components, comprising:
    (a) defining a stepped square-butt joint to be welded by preforming the ends of said torque tubes and assembling such ends together in the nested condition;
    (b) establishing an electrical direct current arc between a positive consumable aluminum-based electrode and said joint as cathode, the arc being shrouded in a shielding gas consisting, by volume, of 2-5% oxygen and the remainder inert gas, the current to the arc being pulsed at a frequency of 40-60 cycles per second while maintaining an average current of at least 200 amps; and
    (c) while holding the pulsed arc in a predetermined orientation to the joint, moving the arc along the joint in a single pass at a relative speed of at least 60 inches per minute.

2. The method as in claim 1 in which, in step (c), said arc has a position relative to said joint defined by a position angle of 45°-60° and a lead angle of 5°-15°.

3. The method as in claim 1 in which the metal transfer takes place by droplet mode, each droplet being no greater in diameter than the diameter of the electrode, with the droplets being transferred at a frequency of about 100 droplets per second.

4. The method as in claim 1 in which said stepped square-butt joint is defined by having one component with a cylindrical wall and a flat radially extending end surface, the second component having a cylindrical wall thickness greater than the wall thickness of said first component with the end of said second component wall recessed to form a cylindrical portion extending axially from a flat radially extending shoulder, the cylindrical neck of the second component having a uniform outside diameter substantially equal to the inside diameter of the cylindrical wall of said first component, whereby when said first component is mated to said second component, the end surface of said first component will be butted against said shoulder in a square flush relationship and the contacting joint interface is created having an L-shaped cross-section with little or no spacing therebetween.

5. The method as in claim 1 in which the base current for said pulsed current is in the range of 200-250 amperes.

6. The method as in claim 1 in which the wire diameter for said electrode is in the range of 0.045-0.0625 inch, and the composition of said wire electrode is an aluminum alloy of the 4000 series.

7. The method as in claim 6 in which said wire electrode is automatically fed at a rate of 200-235 inches per minute.

8. The method as in claim 1 in which the current supplied to said arc has a square waveform and voltage source for said current is maintained generally constant within the range of 23-26 volts with the base voltage being 14-18 volts.

9. The method as in claim 1 in which the shrouding of said arc by said inert gas mixture is conducted by supplying a continuous flow of said gas mixture at a flow rate in the range of 30-40 cfh.

10. The method as in claim 1 in which the speed of relative arc/joint movement is increased during the last 130° of rotation from 60-63 inches per minute to a range of 67-69 inches per minute, accompanied by a reduction in the energy input.

11. In a pulsed arc gas metal welding method for welding aluminum-based workpieces by establishing and maintaining an electrical arc between a positive consumable electrode and workpiece joined together at its joint, the improvement comprising:
    (a) defining the joint to consist of a stepped square-butt joint;
    (b) shrouding the arc in an atmosphere consisting, by volume, of 2-5% oxygen and the remainder argon; and
    (c) moving said arc along said joint in only a single pass at a relative speed of at least 60 inches per minute, whereby the resulting weld will consist of a fusion zone having little or no porosity, no spatter, a penetration of at least 1.3 times the depth of the joint, and a fusion width 1.3 times the depth of the joint.

12. The method as in claim 11 in which the pulsed arc is provided by current having a base current level upon which is periodically superimposed a current pulse having a waveform defined by a pulse width and an amplitude in excess of the base current level and varying the pulse frequency to vary the average current to maintain constant pulse waveform, the frequency is increased as the arc length is reduced to limit the melted globules to a size less than the diameter of the electrode.

13. The method as in claim 11 in which said shrouding of the arc is carried out by merging and intermixing metered flows of oxygen and argon immediately upstream of the weld arc.

14. A method of welding aligned aluminum torque tubes, comprising:
    (a) forming the mating ends of the components to nest together in a stepped square-butt joint with no root opening;
    (b) while said components are assembled together in such nested condition, establishing a direct current electrical arc between said joint and a consumable aluminum metal electrode maintained at positive polarity with said arc shrouded in a shielding gas consisting, by volume, of 2-5% oxygen and the remainder argon;
    (c) holding said arc in an out-of-position welding position and controlling said arc to (i) have a pulse current pulsed at a frequency of 40-60 cycles per second with an average amperage of at least 200 amps, and (ii) to have a position relative to the joint defined by position angle of 45°-60°; and
    (d) rotating said assembled components through one single rotation at a speed of at least 60 inches per minute relative to said arc to completely fuse said joint with sufficient transferred electrode metal by droplet mode transfer for improved fusion with, fusion penetration, and lack of porosity as well as absence of burnthrough.

* * * * *